United States Patent [19]
Barr et al.

[11] Patent Number: 5,979,531
[45] Date of Patent: Nov. 9, 1999

[54] BI-DIRECTIONAL FIBER PLACEMENT HEAD

[75] Inventors: Roy L. Barr, St. Peters, Mo.; Aaron O. Dubberly, Corpus Cristi, Tex.; Kevin J. Sitton, Winfield, Mo.

[73] Assignee: McDonnell Douglas Corporation, St. Louis, Mo.

[21] Appl. No.: 08/941,705

[22] Filed: Oct. 1, 1997

[51] Int. Cl.⁶ .............................. B44C 3/00; G05G 5/00
[52] U.S. Cl. .......................... 156/574; 156/351; 156/353; 156/359; 156/361; 156/365; 156/499; 156/511; 156/512; 156/523
[58] Field of Search .................................. 156/523, 351, 156/365, 497, 499, 511, 517, 560, 574, 353, 361, 512, 359

[56] References Cited

U.S. PATENT DOCUMENTS

| | | | |
|---|---|---|---|
| 4,699,683 | 10/1987 | McCowin | 156/353 |
| 4,769,105 | 9/1988 | Lisec | 156/468 |
| 4,872,619 | 10/1989 | Vaniglia | 242/7.21 |
| 4,877,193 | 10/1989 | Vaniglia | 242/7.21 |
| 4,907,754 | 3/1990 | Vaniglia | 242/7.21 |
| 4,943,338 | 7/1990 | Wisbey | 156/433 |
| 5,022,952 | 6/1991 | Vaniglia | 156/441 |
| 5,045,147 | 9/1991 | Benson et al. | 156/429 |
| 5,110,395 | 5/1992 | Vaniglia | 156/353 |
| 5,290,389 | 3/1994 | Shupe et al. | 156/425 |
| 5,431,749 | 7/1995 | Messner | 156/358 |
| 5,645,677 | 7/1997 | Cahuzac et al. | 156/361 |

*Primary Examiner*—David A. Simmons
*Assistant Examiner*—Linda L. Gray
*Attorney, Agent, or Firm*—Senniger, Powers, Leavitt & Roedel

[57] ABSTRACT

A fiber placement head movable with respect to a surface, for placing fiber tows thereon, including a feed assembly for feeding the tows to a front end of the feed assembly where the feed assembly includes first and second sets of feed tow guides, an applicator assembly at the front end to receive the tows and apply such to the surface where the applicator assembly includes first and second sets of applicator tow guides, and a device for rotating the applicator assembly relative to the feed assembly between first and second positions. In the first position, the first set of applicator guides is aligned with the first set of feed guides, and in the second position, the first set of applicator guides is aligned with the second set of feed guides. The head moves relative to the surface in a first direction when the applicator assembly is in the first position and then moves in a second direction when the applicator assembly is in the second position, to apply the tows, where the first and second directions are generally opposite each other. The head further includes a heater having an outlet near the front end and a manifold to receive hot air from the heater and distribute such to the surface. The manifold includes first and second inlets to receive the air where the first inlet is aligned with the heater in the first position, and the second inlet is aligned with the heater in the second position.

20 Claims, 14 Drawing Sheets

BI-DIRECTIONAL FIBER PLACEMENT HEAD

TECHNICAL FIELD

This invention relates generally to fiber placement systems, and more particularly, to a bi-directional fiber placement head.

BACKGROUND ART

Composite materials such as thermoset resin materials are well known and widely used in the aerospace industry and other industries where materials having a high strength to weight ratio, high temperature tolerance and good corrosion resistance are desirable. Composite structures are often formed by overlapping layers of a fibrous strands or tows impregnated with a thermosetting resin (e.g., graphite fiber impregnated with a matrix material such as epoxy). Fiber placement machines such as the one shown in U.S. Pat. No. 5,110,395, for example, are used to apply a number of individual fiber tows side-by-side to form parts having relatively complex shapes, such as parts having contoured or arcuate surfaces. The fiber placement machine includes a creel assembly comprising a number of spools of tows from which tows are individually fed to a fiber placement head. The tows are fed side-by-side from the head onto the surface of a mandrel or tool, for example, to form a fiber band which is pressed onto the surface by a compaction roller or shoe.

Prior art fiber placement machines such as described above, are operable to lay the fiber tows as the head traverses the surface in only one direction (i.e., forward but not rearward). The fiber placement head is positioned along one edge of the surface and lays a row of tows in one direction along the surface, following which the tows are cut. The head is then moved in a reverse direction and repositioned to a location on the edge of the surface adjacent the first row of tows to lay a second row of tows in the same forward direction. Since the machine does not lay tows while travelling in the reverse direction, the time required for the fiber placement head to travel back along the surface to reposition the head is wasted. For large parts this dead time significantly reduces the efficiency of the fiber placement head.

DISCLOSURE OF INVENTION

The present invention overcomes the deficiencies of the prior art by providing a bi-directional fiber placement head which can place fiber tows on a surface while travelling in two different directions. The fiber placement head significantly reduces manufacturing cost and time by laying fiber tows while the head is moving in forward and reverse directions, thus eliminating the dead time in prior art devices while the head is repositioned to move in the same forward direction. This greatly improves the productivity of the system. The present invention overcomes the limitations of the prior art devices by providing a fiber placement head which increases material pay-out rates.

Generally, a fiber placement head of this invention is reciprocally movable with respect to a surface for placing fiber tows from a tow source on the surface. The fiber placement head comprises a feed assembly for feeding fiber tows in a forward direction from the tow source to a front end of the feed assembly. An applicator assembly is at the front end of the feed assembly for receiving tows from the feed assembly and applying them to the surface. The applicator assembly is mounted for rotation relative to the feed assembly. The fiber placement head further comprises a device for rotating the applicator assembly relative to the feed assembly between a first position for application of tows to the surface as the fiber placement head moves relative to the surface in a first direction, and a second position for application of tows to the surface as the fiber placement head moves relative to the surface in a second direction generally opposite the first direction.

A method of the present invention is for applying fiber tows onto a surface by a fiber placement head. The method includes actuating a feed roller to advance the tows through a feed assembly and deliver the tows to an applicator assembly. The fiber placement head is moved in a first direction while continuously advancing the tows and applying the tows to the surface in the first direction. The tows are cut when the head reaches an end of the surface. The method further includes rotating the applicator assembly relative to the feed assembly. The fiber placement head is then moved in a second direction generally opposite the first direction while continuously advancing the tows and applying the tows to the surface in the second direction.

Other objects and features will be in part apparent and in part pointed out hereinafter.

BRIEF DESCRIPTION OF DRAWINGS

Corresponding reference characters indicate corresponding parts throughout the several views of the drawings.

BEST MODES FOR CARRYING OUT THE INVENTION

Figure 1:
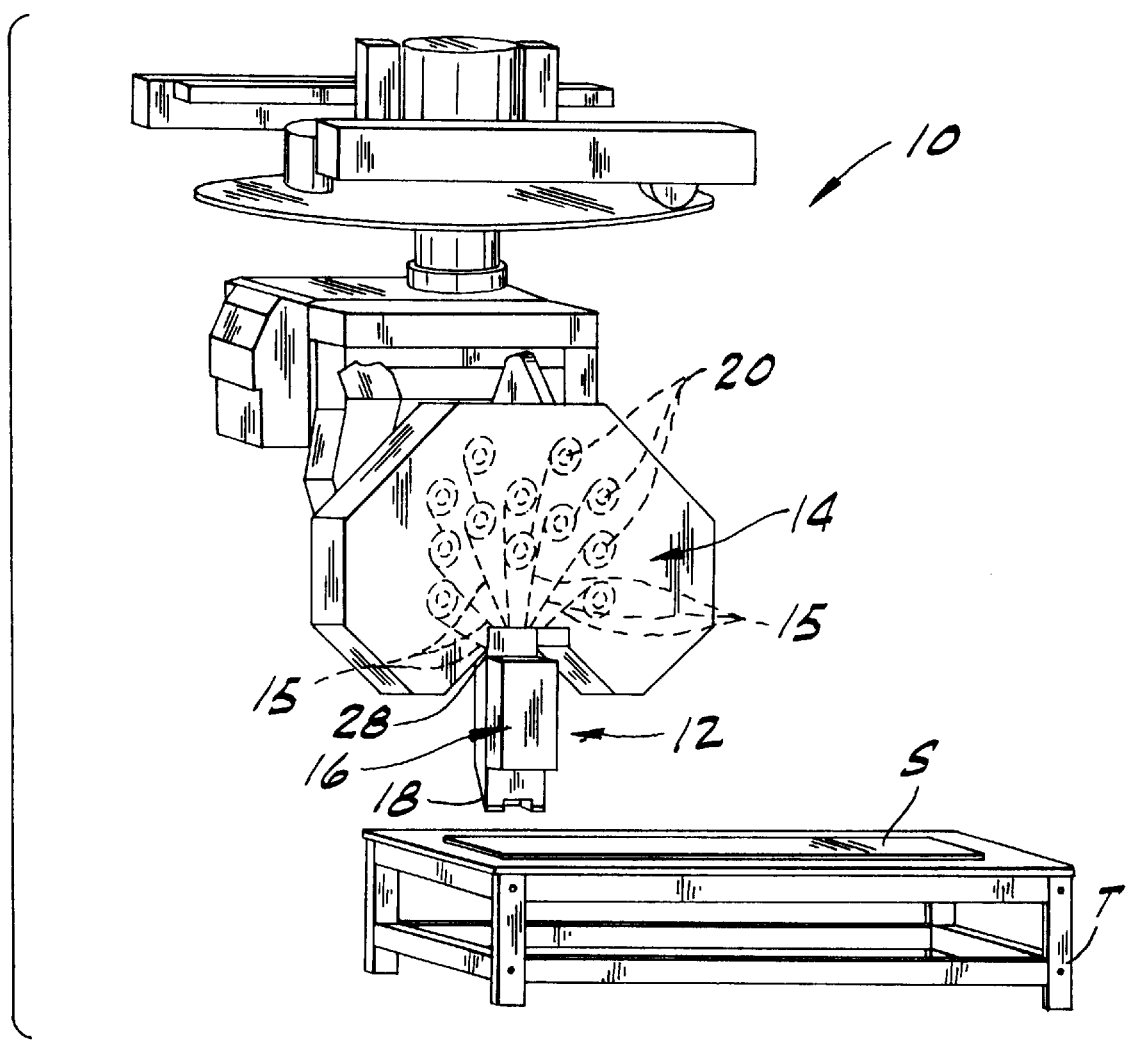
FIG. 1 is a perspective view of a fiber placement system of the present invention.

Referring now to the drawings, and first to FIG. 1, a fiber placement system of the present invention is generally indicated at 10. The system is used to produce various types of composite structures, including those of complex shape such as parts having contoured or arcuate surfaces. The system includes a bi-directional fiber placement head, generally indicated at 12, which is reciprocally movable with respect to a surface S for placing fiber tows 15 on the surface. The surface S may be a mandrel or tool and is supported by a table T or similar support. The surface S may be stationary or rotating on a spindle. The fiber tows 15, also known as "towpregs", are fibrous strands impregnated with a thermosetting resin (e.g., graphite fiber impregnated with a matrix material such as epoxy), or thermoplastic material. The resin may be solution impregnated, melt impregnated or preimedized powder, for example. The tows 15 are generally between 0.125 and 0.25 inches wide and have a thickness of between 0.005 and 0.0104 inches. It is to be understood that the material or size of the tows 15 may vary without departing from the scope of the invention. The fiber placement head 12 lays down tows at a rate of about 100 ft/min., for example, and is preferably configured to move along six different axes.

Figure 2:
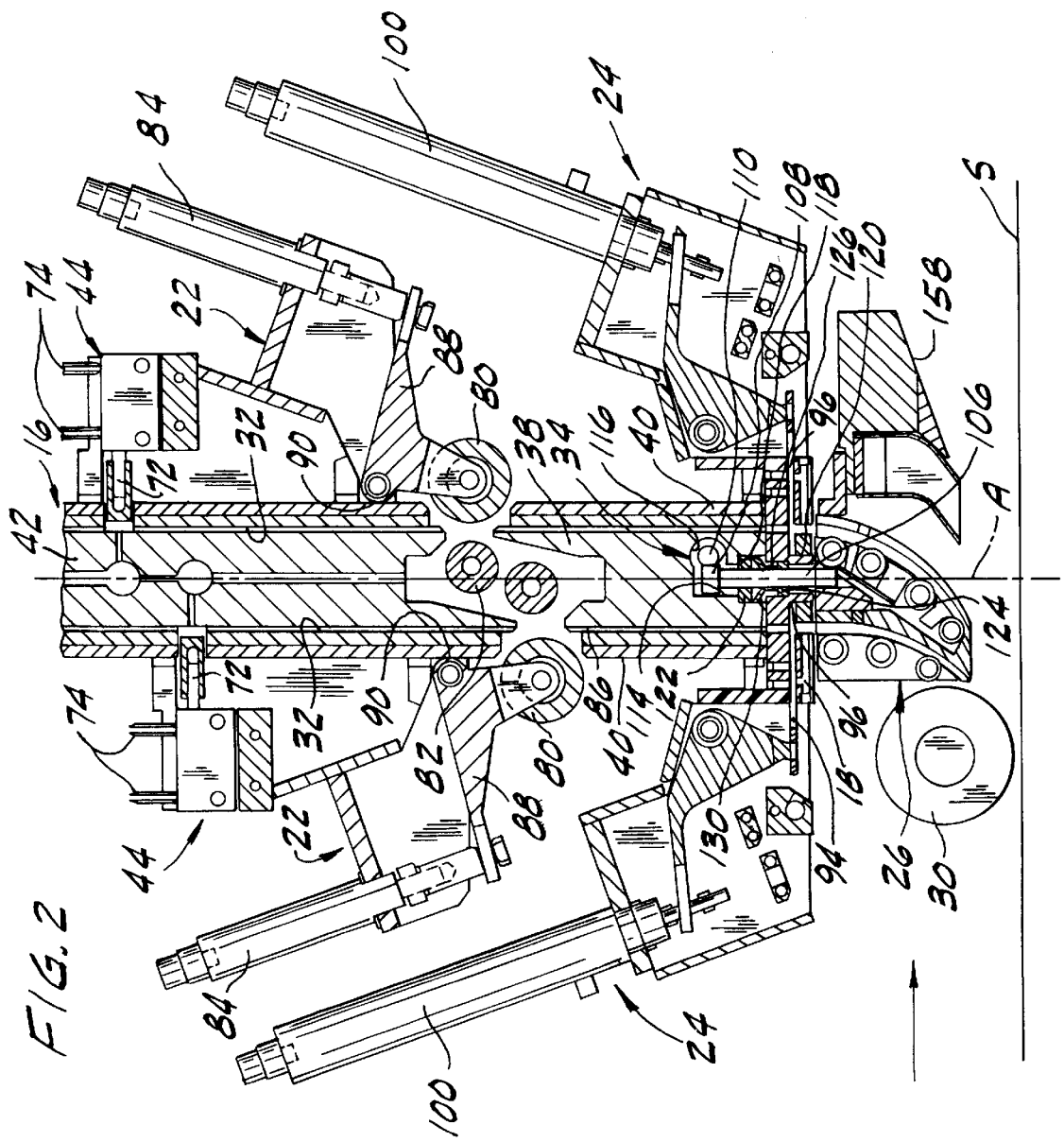
FIG. 2 is a partial cross-sectional schematic view of a fiber placement head of the system of FIG. 1.

The fiber placement head 12 includes a source of fiber tows, generally designated 14 and a feed assembly, generally designated 16, for feeding the fiber tows 15 in a forward direction from the tow source to a front end 18 of the feed assembly. The source 14 of fiber tows 15 may be a creel assembly comprising individual spools 20 upon which the individual tows are wound. The feed assembly 16 includes two add modules, generally designated 22, for selectively advancing individual tows 15 through the feed assembly and a cutting assembly comprising two cut modules, generally designated 24, for selectively cutting individual tows (FIG. 2). An applicator assembly, generally indicated at 26, is located at the front end 18 of the feed assembly 16 for receiving tows 15 from the feed assembly 16 and applying them to the surface S. The applicator assembly 26 is mounted for rotation relative to the feed assembly 16 between a first position for application of tows 15 to the surface as the fiber placement head 12 moves relative to the surface S in a first direction through a forward stroke (FIG. 2), and a second position for application of tows to the surface as the fiber placement head moves relative to the surface through a reverse stroke in a second direction (FIG. 3), generally opposite the first direction. The second direction is preferably offset 180 degrees from the first direction so that the tows 15 are laid adjacent and parallel to the previous row of tows. The second direction may be offset at an angle other than 180 degrees to accommodate openings or other variations in the surface S. Adhesion of the material to the surface S is accomplished by directing heat at the surface to warm the surface and pressing the tows 15 against the surface by a compaction device 30.

The tows 15 are fed from a plurality of spools 20 (e.g., twelve spools) of the creel assembly 14 to a rearward end 28 of the feed assembly 16 where the tows are separated into two sets of tows (e.g., six tows per set as shown in FIG. 1). The feed assembly 16 comprises two sets of feed tow guides 32 for guiding the two sets of tows 15 as the tows are fed in the forward direction (FIG. 2). The tow guides 32 may be configured to lay down essentially any number of tows 15 at one time (e.g., 1–32 tows). Each set of tow feed guides 32 extends generally parallel to the other set of tow feed guides. The parallel orientation of the guides 32 allows for placement of a drive system, generally indicated at 34, for rotating the applicator assembly 26, between the tow guides. This parallel orientation is advantageous over a convergent arrangement because it allows the length of the applicator assembly 26 to be kept to a minimum while still providing sufficient room for the drive system 34 to be mounted between the two sets of tow guides 32 adjacent the forward end 18 of the feed assembly 16. It will be noted in this regard that it is important to maintain a short distance (i.e., less than about 4.0 inches) between the cutting assembly 24 and the outlet of the applicator assembly 26 so that short tows 15 can be formed for application to small, intricate or detailed parts. For this reason, the two sets of tow guides 32 are preferably positioned parallel to one another.

Figure 4:
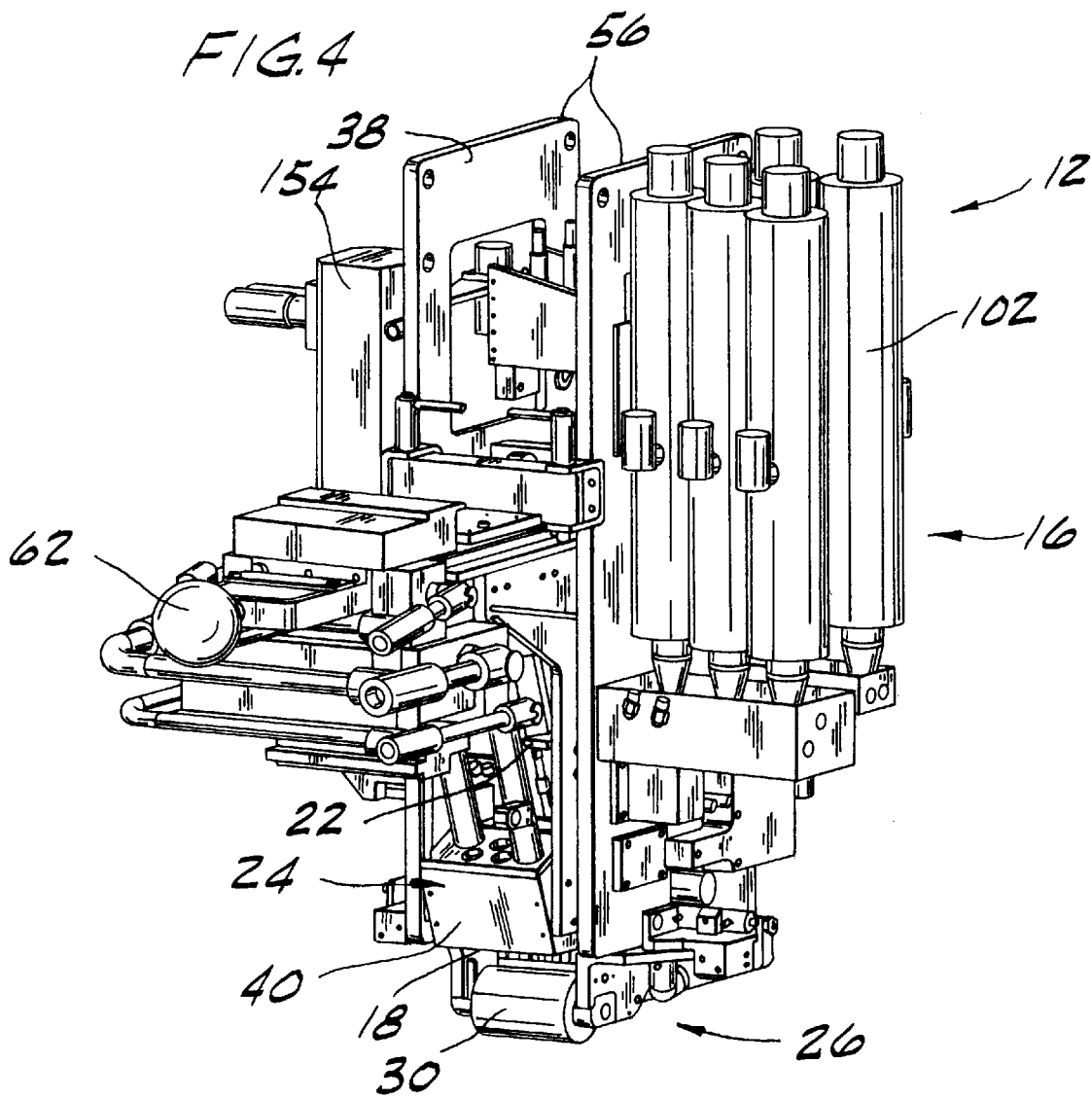
FIG. 4 is a perspective view of the fiber placement head.
Figure 5:
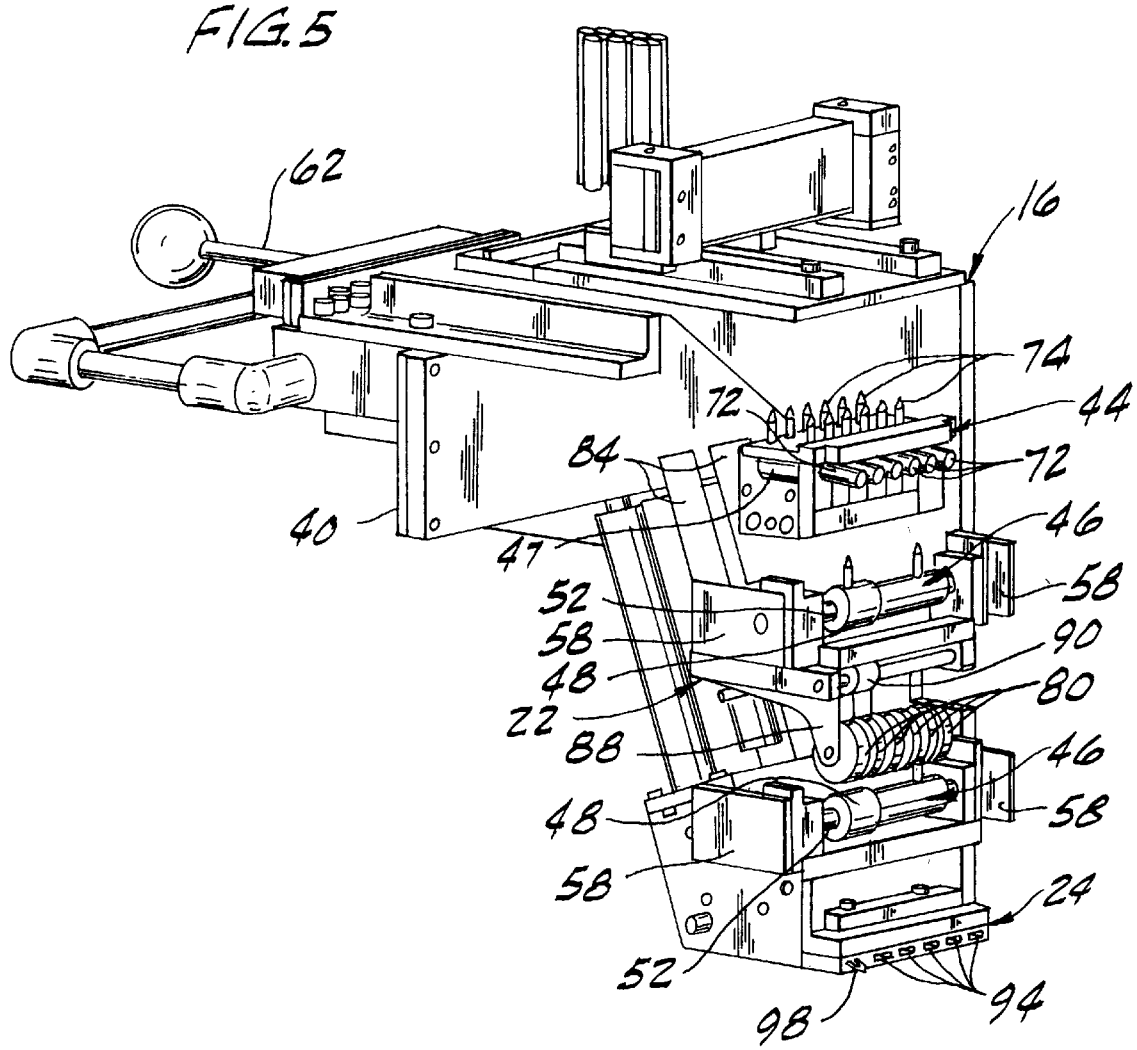
FIG. 5 is a perspective view of a side section of the fiber placement head.
Figure 6:
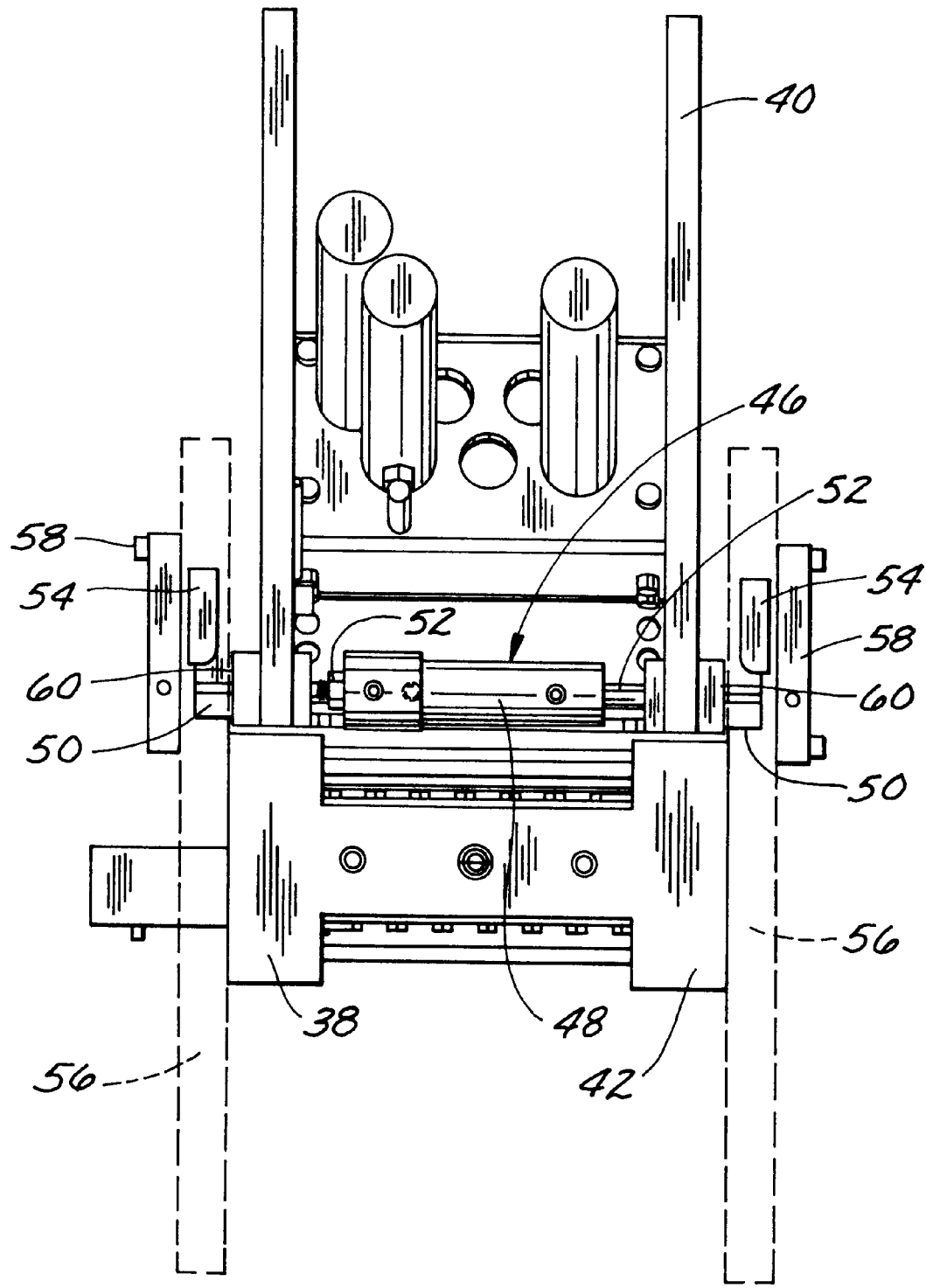
FIG. 6 is a top view of a center section and the side section of the fiber placement head.
Figure 7:
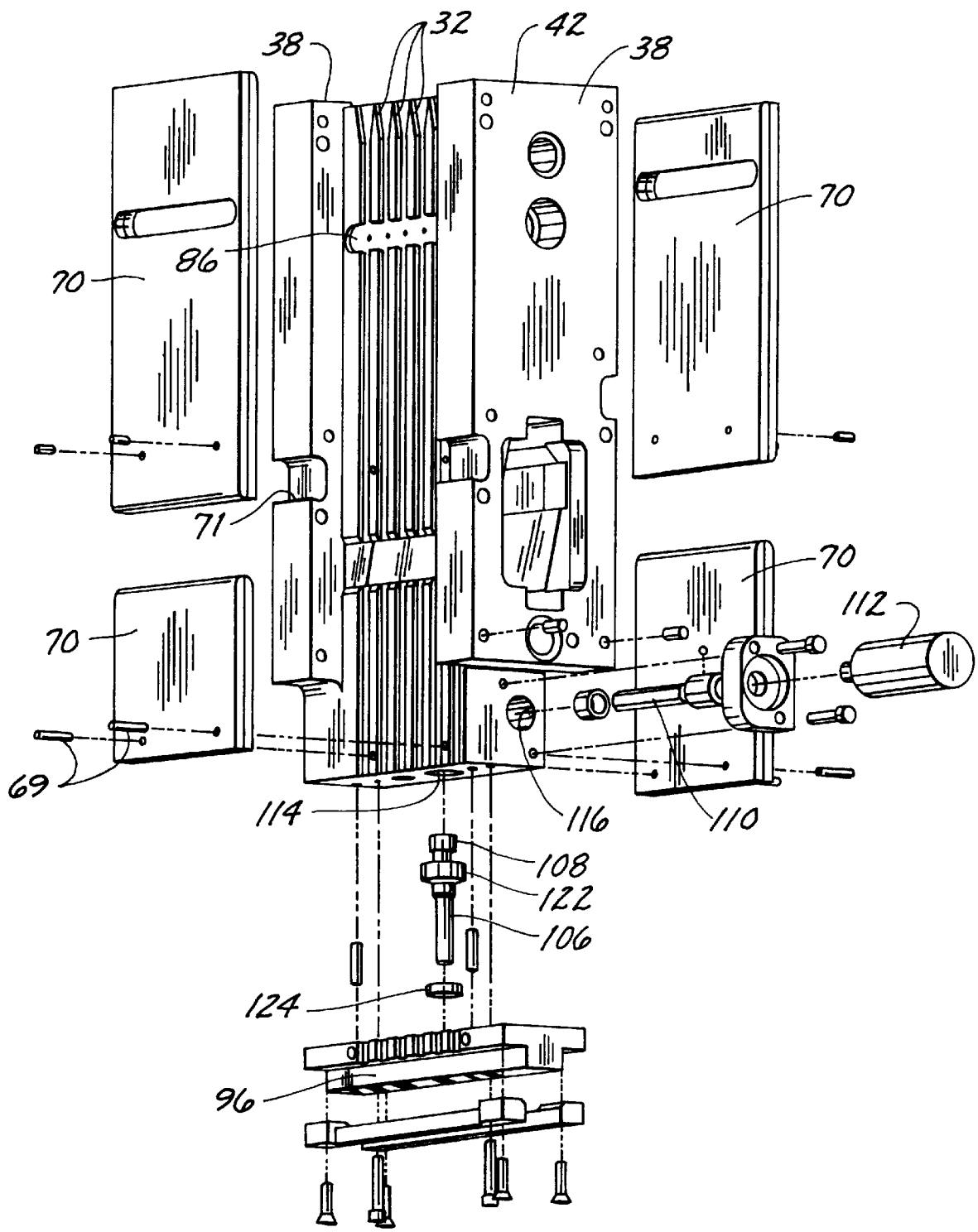
FIG. 7 is an exploded view of the center section of the fiber placement head.

The feed assembly 16 includes a center section 38 and two opposing side sections 40 (FIGS. 2 and 4). The center section 38 comprises an elongate one-piece center block 42, as shown in FIG. 7. The center block 42 is generally I-shaped but may be formed in other shapes. Each side section 40 includes pinch modules, generally designated 44, the add modules 22 and the cut modules 24, which will be described below. These are all of modular design to permit easy removal and replacement. The side sections 40 are releasably mounted to the center section 38 to allow easy access to the center section and feed tow guides 32. The side sections 40 are hinged to the center section 38 along respective sides of the center section and held in place by two latching mechanisms, generally indicated at 46, which lock the side sections to the center section (FIGS. 5 and 6). Each latching mechanism 46 comprises an air cylinder 48 and a pair of keepers 50, each keeper located at one end of the cylinder and attached to the cylinder by pins 52. Outer panels 58 are located on each side of the side section 40 and are spaced from each keeper 50. The latching mechanism 46 further comprises a pair of latching members 54 mounted on side plates 56 connected to the center block 42. The cylinder 48 comprises two sections which are axially movable relative to a fixed shaft, to extend and retract the pins 52 and keepers 50. The keepers 50 are movable between a retracted position in which the side section 40 is free to be swung away from the center section 38, and an extended position in which the keepers 50 engage the latching mechanism 46 to secure the side sections to the center sections. When the keepers 50 are in their retracted position, the keepers are each spaced a sufficient distance from the adjacent outer panel 58 so that each side plate 56 of the center section 38 can be received between a respective keeper and outer panel as the side section 40 is moved towards the center section. When the keepers 50 are in their extended position they engage the latching members 54 and prevent the side section 40 from being pulled away from the center section 38. The latching mechanism 46 is designed to be self-locking so that if the air cylinder 48 loses air pressure the latching mechanism will remain in its locked position. A detent (not shown), for example, may be used to retain the cylinder and keepers 50 in their extended position without air pressure.

The keepers 50 and latching members 54 may have camming surfaces 60 for pulling the side sections 40 up tightly against the center section for proper alignment of the pinch, add and cut modules 44, 22, 24 with the center section. The side section 40 is aligned with the center section 38 by pins 69 (FIGS. 5 and 7) located in the cut module 24 for engagement with the center block 42. The side section 40 is pulled up tightly against the center section 38 by the pins 69, and engagement of the add module 22 with the center section at recess 71. The outer panels 58 preferably include proximity sensors which detect engagement of the keepers 50 with the latching members 54. A quick release lever 62 actuates the air cylinders 48.

The feed tow guides 32 are located on the center section 38 and are generally U-shaped channels formed in the center block 42 for guiding the tows 15 and keeping the tows separated from one another (FIG. 7). One set of parallel tow guides 32 is formed in one face of the center block 42 and the other set is formed in an opposite face of the center block. The two sets of tow guides 32 are offset from one another so that the tows exit the applicator assembly side-by-side. Cover plates 70 are positioned over the two sets of feed tow guides 32 to maintain the tows 15 in their respective channels, keep the tows at correct spacing, and prevent the tows from touching each other and sticking together.

As the tows 15 enter the feed assembly 16 they first pass the pinch modules 44 which are operable to hold the tows in the guides 32 after the tows have been cut by the cutting assembly 24 (FIGS. 2 and 5). Without the pinch modules 44, a creel tensioning module not shown, provided to maintain tension on the tows 15, would pull the tows in a rearward direction back out of the feed assembly 16. The pinch module 44 has a plurality of clamping devices 72 comprising pneumatic cylinders 47 positioned adjacent respective tows 15 to clamp the tows against the bottom of the channels forming the feed tow guides 32. Extend and retract conduits 74 are provided to supply air to each cylinder 47. The pinch module 44 receives on and off commands from a system control unit (not shown) in response to actuation of the cut module 24. Upon receiving a signal from the control unit in response to a particular tow 15 being cut, the appropriate cylinder 47 is actuated by air pressure to extend a piston (clamping device 72) through an opening in the cover plate 70 and grip the tow, thereby preventing the tow from being pulled in a rearward direction from the feed assembly 16. One way rollers or spring fingers (not shown) may also be used to prevent movement of the tows in a rearward direction. These devices would not have to be actuated and could be located on the center section 38 so that the tows 15 do not back out of the feed assembly 16 when the side sections 40 are unlocked from the center section 38.

The add modules 22 are located downstream of the pinch modules 44 and include individual add rollers 80 for pressing individual tows 15 against a feed roller 82 to feed each tow towards the forward end 18 of the feed assembly 16 (see FIGS. 2 and 5). Two sets of add rollers 80 are provided, each set having six add rollers to correspond to the six tows 15. The feed assembly 16 includes two feed rollers 82 each cooperable with one set of add rollers 80. Each add roller 80 is selectively actuated by an air cylinder 84 which forces the add roller in the direction of an opening 86 in a respective tow guide 32 toward the continuously driven feed roller 82, thereby engaging and advancing the tow 15 toward the forward end 18 of the feed assembly 16. Each add roller 80 is supported by a lever 88 having a pivot connection 90 with the center block 42 at a location rearward of the add roller. The cylinder 84 forces the add roller 80 towards the feed roller 82 by pivoting the lever 88 about the pivot connection 90. The add rollers 80 are controlled by the system control unit. The two feed rollers 82 are offset from one another to minimize the spacing between the two sets of feed tow guides 32.

The cutting assembly 24 is located adjacent the forward end 18 of the feed assembly 16 and is operable to selectively cut each of the tows 15 prior to rotation of the applicator assembly 26, or upon the fiber placement head reaching an opening in the surface S at which time some of the tows may be cut and later added again. The tows 15 may also be individually cut for applications such as a tapered edge, where it is desirable to eliminate some of the tows at the ends of the tapered edge to avoid a build-up along the edge. The cutting assembly 24 comprises a plurality of knives 94, each of which is mounted for movement from a retracted position to an extended position for cutting a respective tow 15, and then back to the retracted position (FIG. 5). The knives 94 have an opposing stationary anvil 96 so that the tow is sheared between a cutting edge of the knife and the anvil (FIGS. 5 and 7).

Each knife 94 has a central longitudinal slot 98 for receiving a guide pin (not shown) for guiding the knife as it moves between its retracted and extended positions to provide precise cutting and maximize the width of each knife for increased reliability. The knives 94 are preferably formed from hardened steel. Other types of cutting devices such as a laser cutter or an ultrasonic cutter may also be used. The knives 94 are pneumatically actuated by air cylinders 100 for movement to their retracted and extended positions (FIG. 2). Air is supplied to the cylinders 100 upon receiving appropriate signals from the system control unit. Separate solenoids are provided for extending and retracting the cylinders 100. The individual solenoids permit the retract air pressure to be completely relieved before the extend air pressure is activated. This increases the acceleration and speed of the knives 94 by eliminating back pressure in the cylinders 100. A higher cutting speed allows cutting of thicker material, produces a cleaner cut and extends the life of the knives 94.

Figure 8:
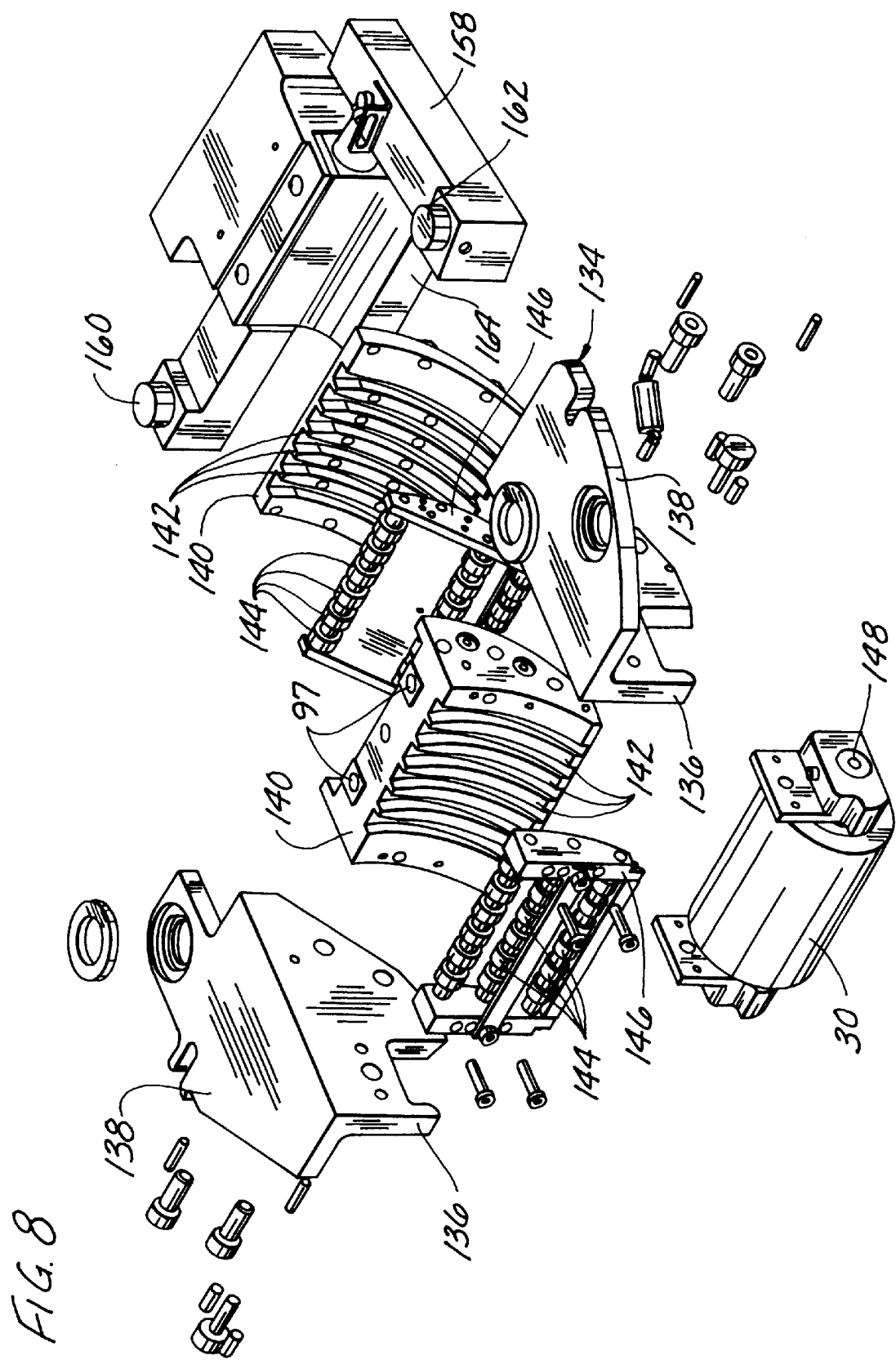
FIG. 8 is an exploded view of an applicator assembly of the fiber placement head.

A cooler 102 is provided to cool the tows 15 as they pass through the add and cut modules 22, 24 to improve the material handling characteristics of the tows and thereby prevent the tows from becoming tacky and sticking to the rollers and guides, and to prevent resin buildup on the machine parts (FIG. 4). At lower temperatures most thermoset resins are stiffer and less tacky than at room temperature. The cooling of the tows 15 improves the quality, reliability and ease of operation of the fiber placement head 12. The cooling is accomplished by blowing cold air over various parts of the feed assembly 16 and passing cold air through the center block 42 and applicator assembly 26. Cold air is passed from the center block 42 into the applicator assembly 26 via holes 97 (FIGS. 4 and 8). The cooler 102 preferably maintains the tow material at a temperature less than 40° F. An electronic controller (not shown) is preferably provided to monitor the temperature within the feed assembly 16 and to turn the cooler on and off as required. Vortex coolers may be used to blow cold air (e.g., 15° F.) onto brass cooling rollers (not shown) located upstream from the add and cut modules 22, 24. The rollers contact the tows 15 and cool the tows as they move past the rollers. The coolers 102 may also blow directly onto the clamping devices 72, add rollers 80 and knives 94 to cool the tows 15 as they pass these components. The cooling may also be accomplished by enclosing and applying air conditioning to sections of the fiber placement head 12, or by running a cooled gas or liquid (e.g., nitrogen) through the fiber placement head.

As shown in FIGS. 2 and 7, the drive system 34 is mounted within the center section 38 of the feed assembly 16 and comprises a shaft 106 extending in a forward direction and connected to the applicator assembly 26 for rotating the applicator assembly. The shaft 106 has an integral pinion 108 engageable by a rack 110 which is reciprocally movable by means of a pneumatic drive cylinder 112. The pinion 108 is cooperable with the rack 110 which rotates the pinion to effect rotation of the shaft 106 and applicator assembly 26. The pinion 108 and rack 110 have intermeshing surfaces which permit axial movement of the rack to effect rotational movement of the pinion. The arrangement being such that extension of the drive cylinder 112 causes rotation of the pinion 108 and shaft 106 in one direction, and retraction of the cylinder causes rotation of the pinion and shaft in the opposite direction. The shaft 106 is interposed between the two sets of feed tow guides 32 and extends generally parallel to the tow guides. The center block 42 includes a longitudinal bore 114 extending into a lower portion of the center block 42 for receiving the shaft 106 and pinion 108. A bore 116 extends transversely to the longitudinal bore 114 for receiving the rack 110. The drive cylinder 112 is mounted externally to the center block 42. The longitudinal bore 114 includes an upper shoulder 118 and a lower shoulder 120 for engagement by two bushings 122, 124 within which the shaft 106 is rotatably mounted. A snap-ring 126 is connected to the shaft 106 to limit axial movement of the shaft. A curved or belleville washer 130 is interposed between the two bushings 122, 124.

The pinion 108 rotates the applicator assembly 26 approximately 180 degrees about an axis A generally perpendicular to the surface S and generally parallel to the direction of feed of the tows 15 from the feed assembly 16. It is to be understood that other types of drive systems may be used and the axis A of rotation of the applicator assembly may be different than the one shown without departing from the scope of this invention. The applicator assembly 26 is preferably counterbalanced so that the applicator assembly can rotate regardless of the orientation of the fiber placement head 12.

The applicator assembly 26 includes a frame 134 comprising two frame members 136, each frame member having an alignment flange 138 extending laterally outward therefrom (FIG. 8). Two unitary curvlinear bodies 140 extend between the frame members 136 in a spaced relation. The bodies 140 each include generally U-shaped channels defining applicator tow guides 142. The applicator tow guides 142 are arranged for alignment with the two sets of feed tow guides 32 for receiving the tows 15 from the feed assembly 16 and orienting the tows to form an essentially continuous fiber band which is pressed against the surface S by the compaction device 30 (FIGS. 2 and 8). The two sets of applicator tow guides 32 are staggered or offset from one another so that upon exiting the applicator assembly 26 the tows 15 from the two sets of tow guides are arranged to be laid down side-by-side in alternating fashion onto the surface S. The applicator assembly 26 further includes a plurality of idler rollers 144 held in place by two idler roller assemblies 146 adjacent each body 140, for maintaining the tows 15 within each applicator tow guide 142 and providing smooth advancement of the tows within the tow guides. The length of each applicator tow guide 142 is preferably less than about 4.0 inches to allow for the laying of short pieces of tows 15 on intricate or detailed parts. In order to provide a minimum tow 15 length of about 4.0 inches, the applicator tow guides 142 are preferably less than 4.0 inches. For example, the front tow guide 142 may be 3.0 inches and the rear tow guide may be 3.7 inches.

The compaction device 30 is rotatably mounted on a shaft 148 which is connected at each end to the frame members 136. The compaction device 30 provides a uniform force to adhere the material to the surface S (or previous laid tows) and prevents material slippage during lay down. The compaction device 30 may be a conformal roller having a metal core with an urethane coating which conforms to the shape of the surface S as it travels across the surface. Solid metallic rollers which are fabricated to match the curvature of the surface S may also be used for cylinders and flat surfaces. Another type of compaction device which may be used is a conformal shoe which conforms to the shape of the surface S as it traverses the surface. The compaction device 30 preferably provides approximately 100 pounds of compaction force per inch of band width.

Figure 3:
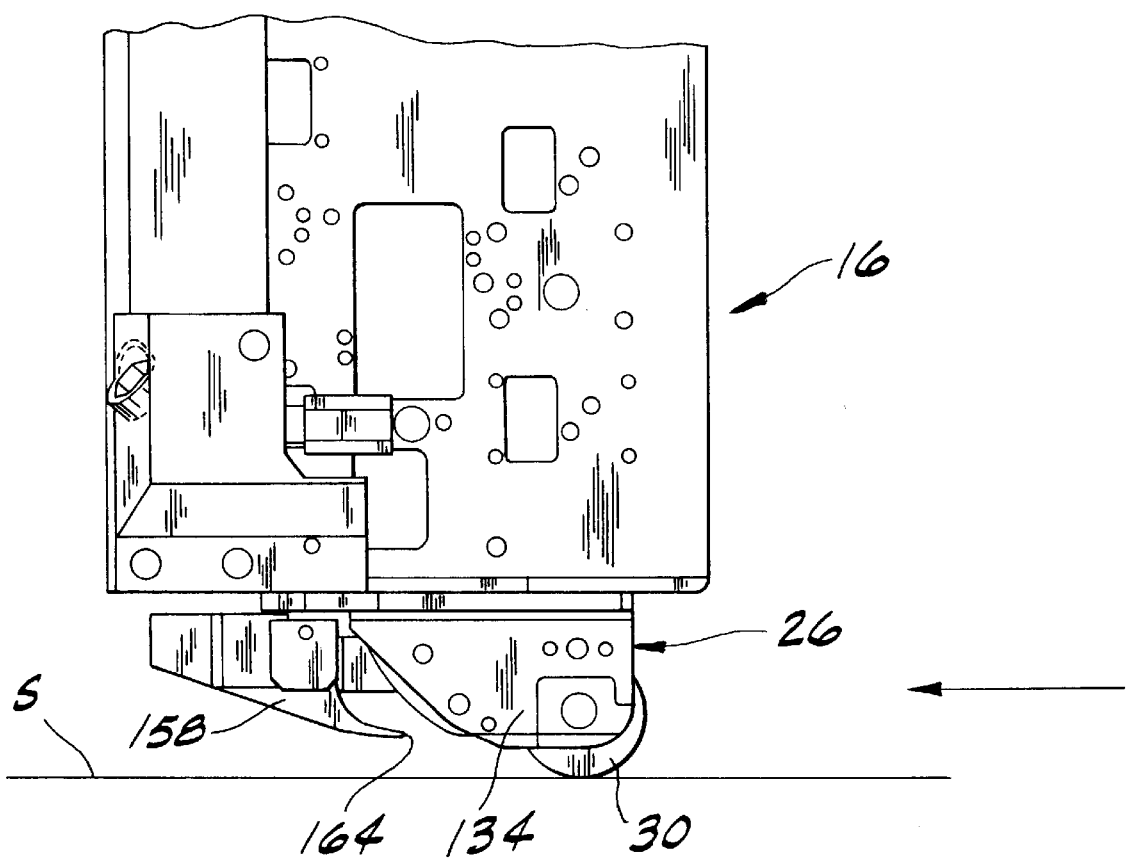
FIG. 3 is a partial side view of the fiber placement head.
Figure 9:
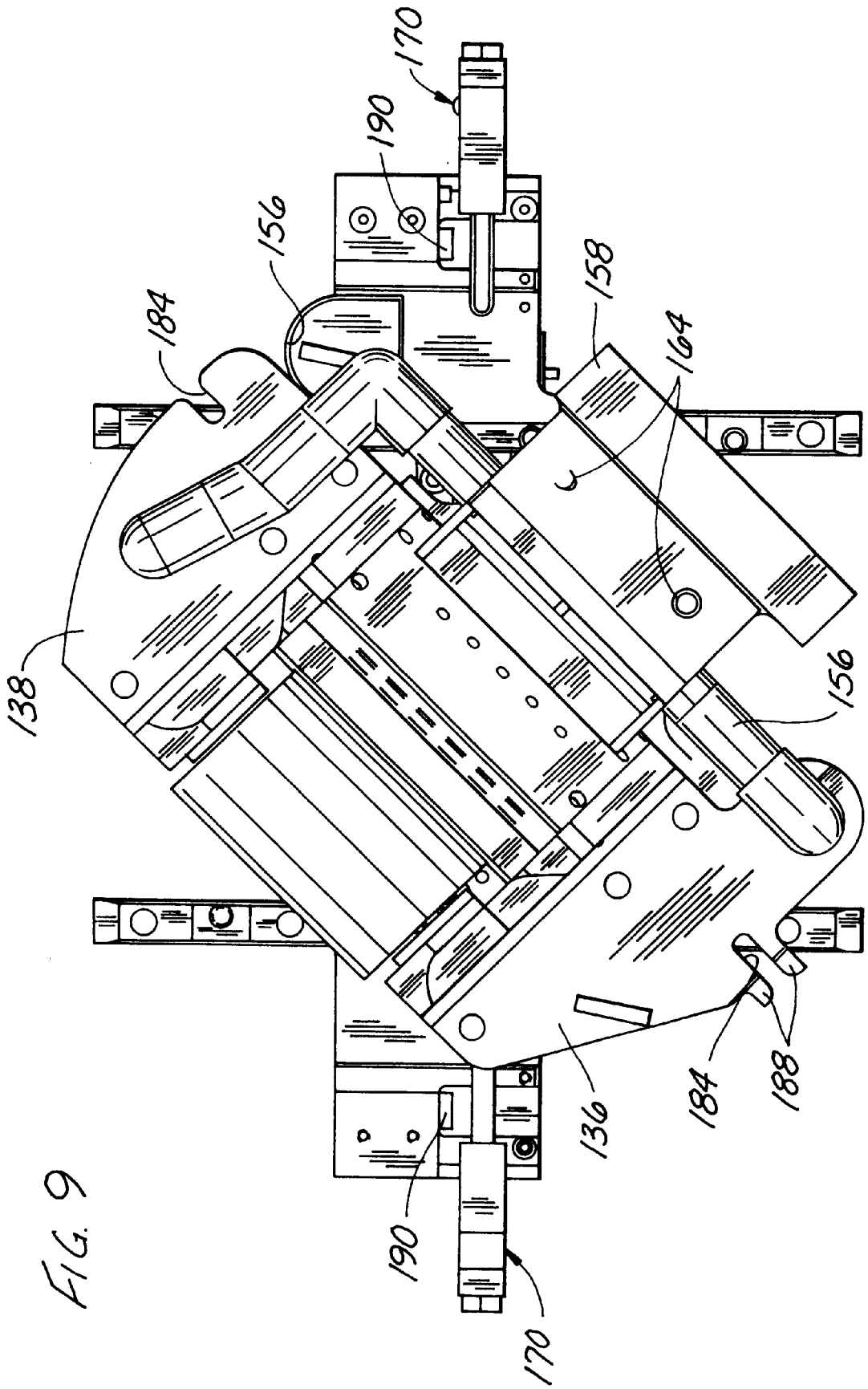
FIG. 9 is a bottom view of the fiber placement head with an applicator assembly of the fiber placement head rotated between first and second positions relative to a feed assembly of the fiber placement head.

A heater 154 is located on the feed assembly and has an outlet 156 located near the forward end 18 of the feed assembly 16 (FIGS. 4 and 9). The applicator assembly 26 includes a heater manifold 158 for receiving hot air from the heater and distributing hot air to the surface S (FIGS. 3 and 8). The hot air heats the surface S immediately prior to applying the tows 15 to increase the tackiness of the tows and promote tow adhesion. The manifold 158 includes first and second rearwardly-facing inlets 160, 162 for receiving hot air from the heater outlet and a forwardly-facing outlet 164 for directing hot air onto the surface S. The first inlet 160 of the manifold 158 is positioned for alignment with the heater outlet 156 when the applicator assembly 26 is in its first position for laying tows 15 in the stated first direction, and the second manifold inlet 162 is positioned for alignment with the heater outlet 156 when the applicator assembly is in its second position for laying tows in the stated second direction. The heater 154 is preferably operable to heat the surface to 100–150° F. for toughened epoxy resin systems and 300–900° F. for thermoplastic and polyimide materials. The temperature is preferably monitored by the system control unit which also turns the heater 154 on and off. Infrared heaters, laser heaters or a heated compaction device may also be used.

Figure 11:
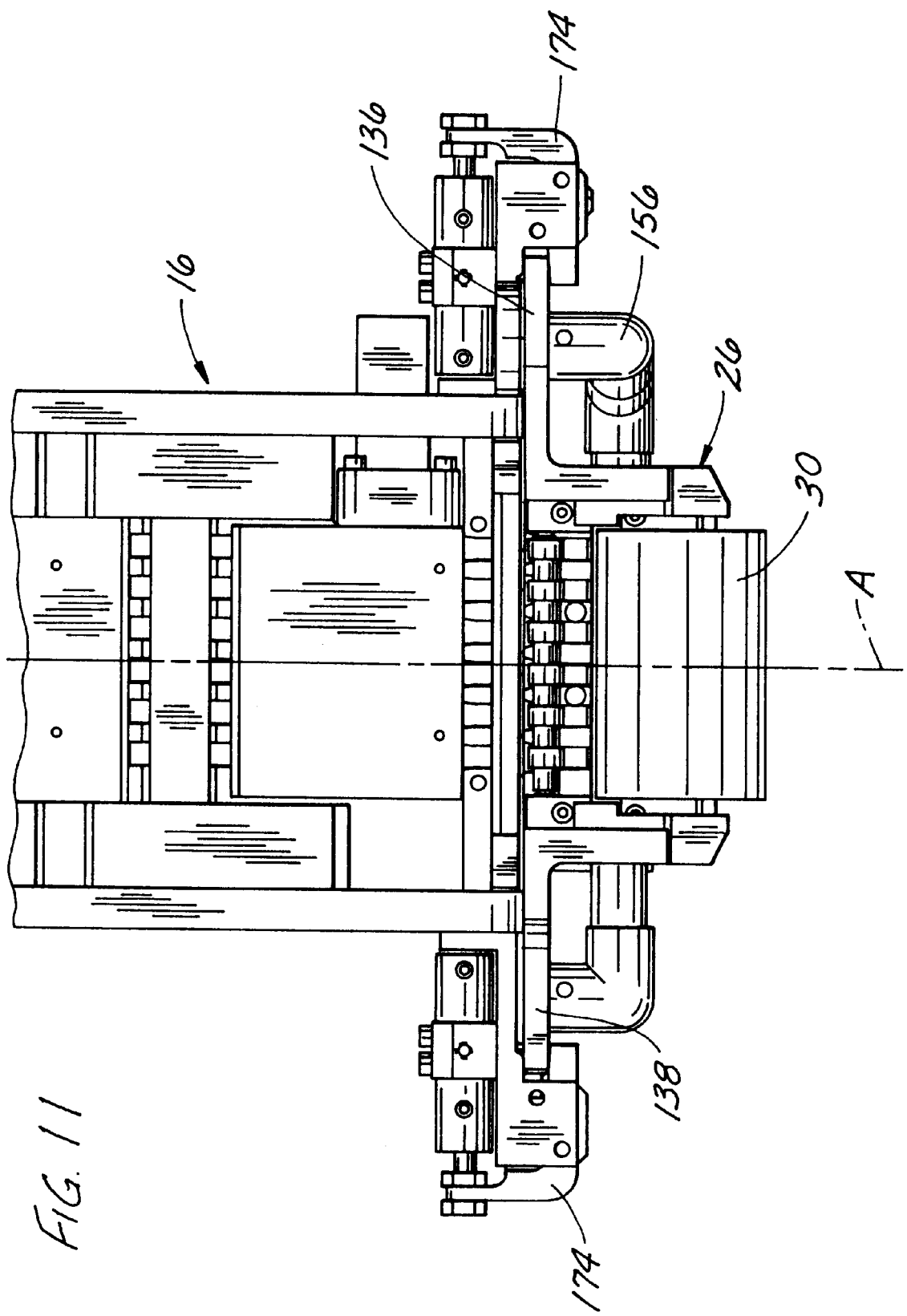
FIG. 11 is a partial rear view of the fiber placement head with the applicator assembly locked in its first position.
Figure 12:
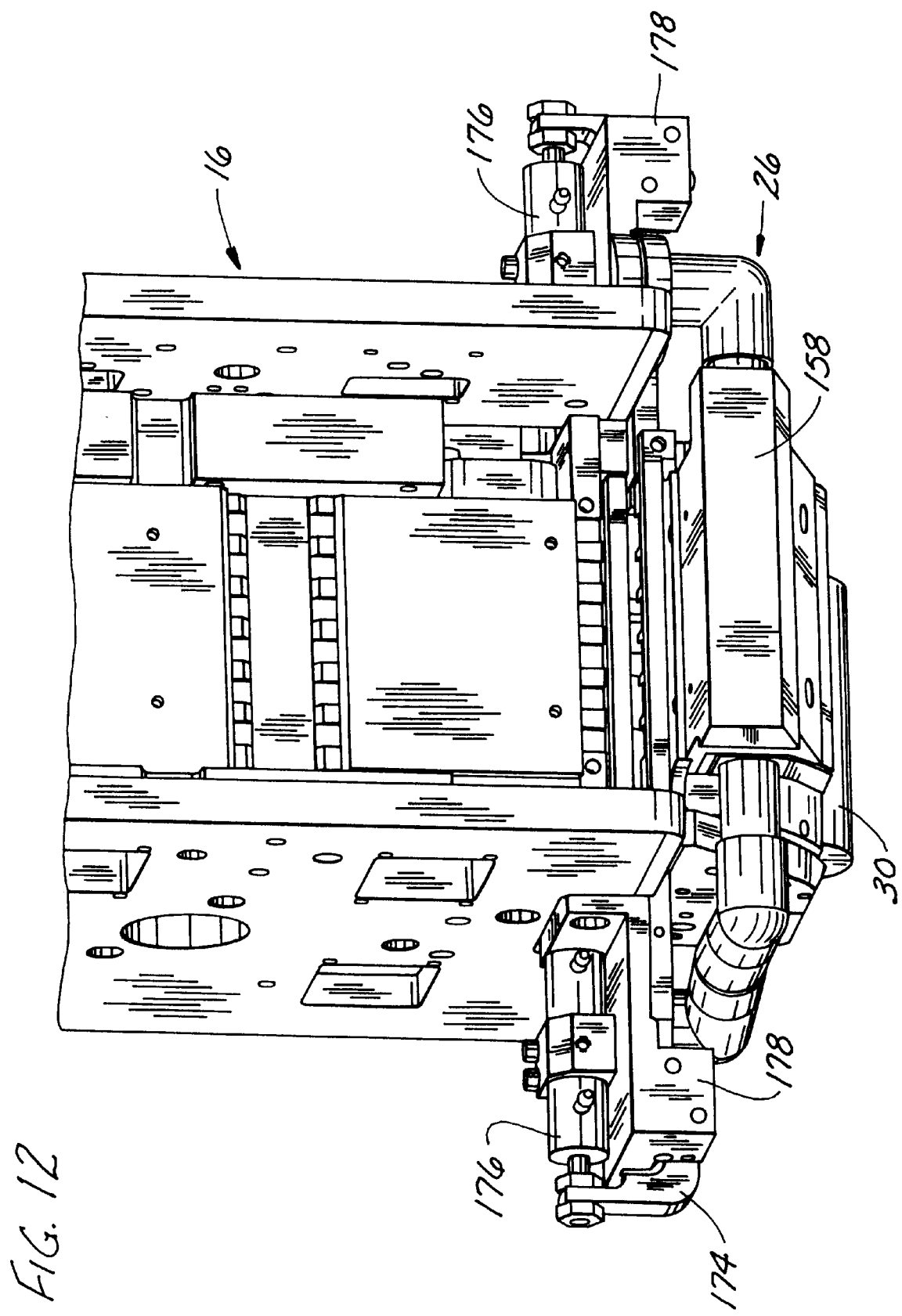
FIG. 12 is a partial perspective view of the fiber placement head with the applicator assembly locked in its second position.

The feed assembly 16 further includes a locking system comprising two locking mechanisms, generally designated 170, (FIG. 10) for locking the applicator assembly 26 in its first position (FIG. 11) and second position (FIG. 12). The locking mechanisms 170 are movable between a retracted position (FIGS. 13 and 14) for allowing the applicator assembly 26 to rotate between its first and second positions about the axis A of rotation, and a locking position (FIGS. 11 and 12) in which the locking mechanisms 170 engage the applicator assembly to prevent rotational and axial movement of the applicator assembly with respect to the axis of rotation. When the locking mechanisms 170 are in their locked position they also bear the operational load on the applicator assembly 26 transmitted through the compaction device 30 during the laying of the tows 15. The operational loads may be axial loads normal to the surface S or loads following a curved path along the surface. The operational loads from the compaction device 30 are transferred through the frame members 136 to the locking mechanisms 170. Since the locking mechanisms 170 support the load transmitted through the applicator assembly 26 during application of the tows 15 to the surface S, the drive system 34 may be sized to carry only loads created by the weight of the applicator assembly when the locking mechanisms are in their retracted positions. The pinion shaft 106 is preferably sized to carry torsional impact loads which occur during rotation of the applicator assembly 26.

Figure 10:
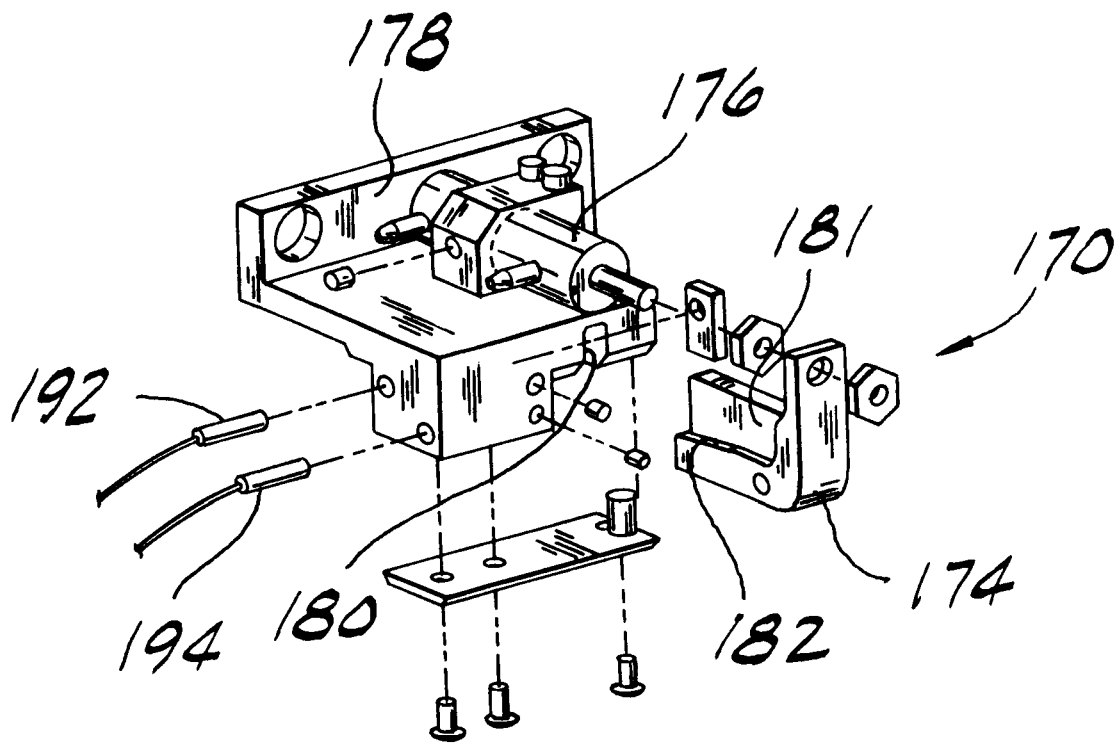
FIG. 10 is an exploded view of a locking mechanism of the fiber placement head.
Figure 13:
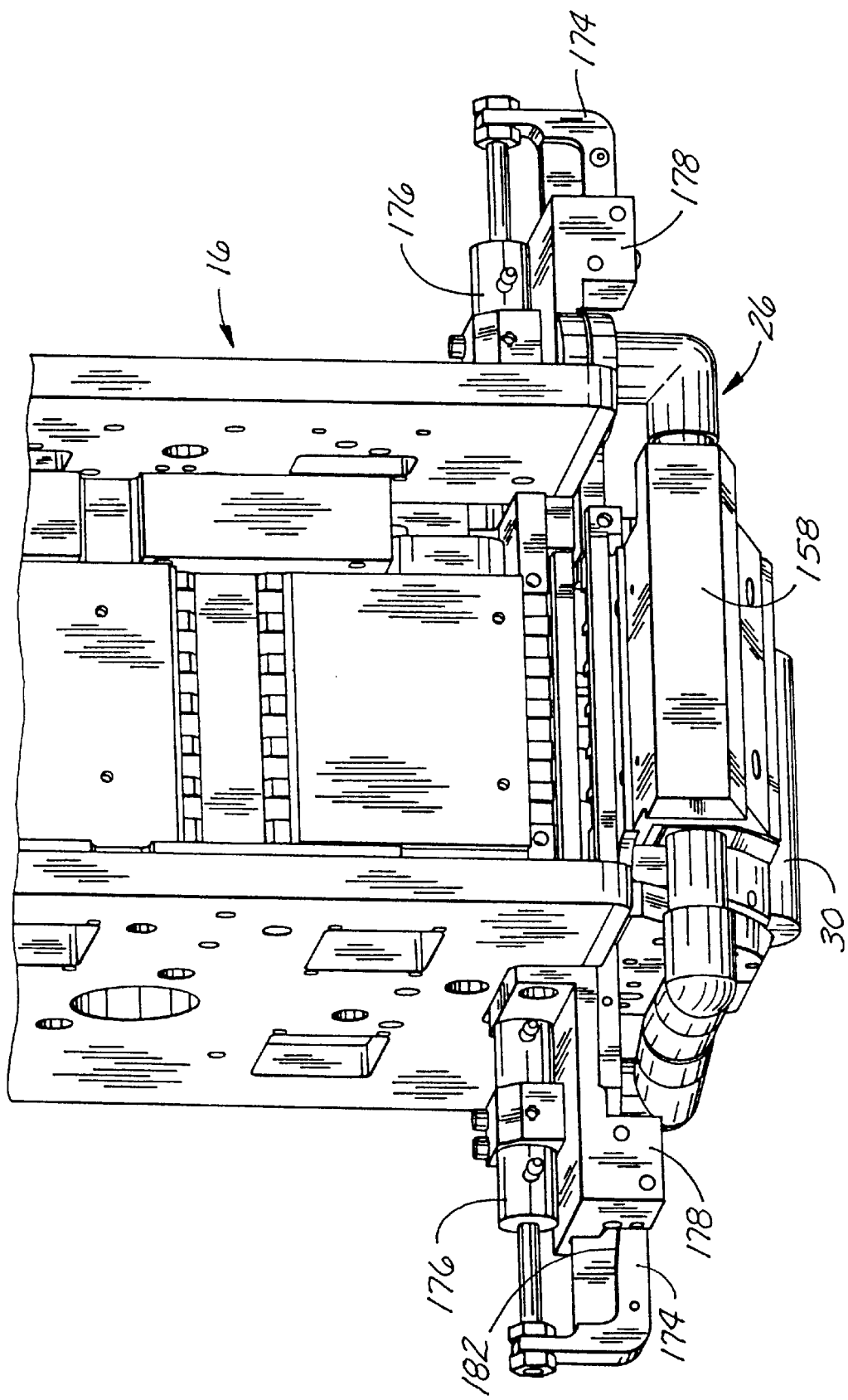
FIG. 13 is a partial perspective view of the fiber placement head of FIG. 12 with the applicator assembly in an unlocked position.
Figure 14:
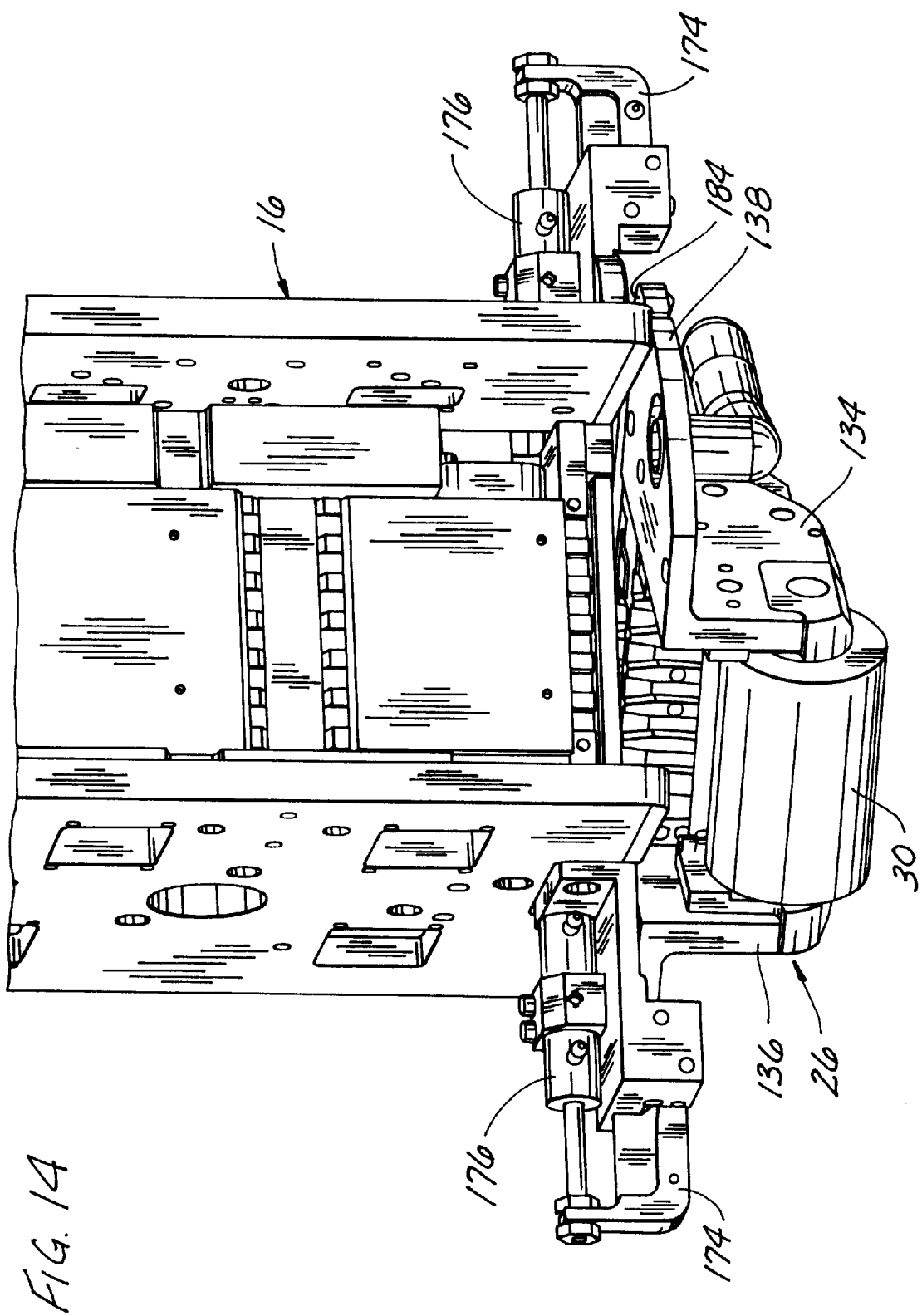
FIG. 14 is a partial perspective view of the fiber placement head with the applicator assembly rotated to an intermediate position between its first and second positions.

The locking mechanisms 170 include a pair of locking arms 174 engageable with the alignment flanges 138 of the respective frame members 136 of the applicator assembly 26 (FIGS. 10 and 11). Each locking arm 174 is actuated by a pneumatic cylinder 176 secured to a mounting block 178 which is affixed to the side plates 56 of the center section 38 by suitable fasteners. As illustrated best in FIG. 10, the underside of each block 178 is formed with a guide slot 180 which receives a follower 181 extending from the locking arm 174 for proper alignment of the locking arm as it moves between its retracted and locking positions. The locking arms 174 of the two locking mechanisms 170 have inclined surfaces 182 for engagement with lower surfaces of the respective alignment flanges 138 so that the locking mechanisms push the applicator assembly 26 toward the feed assembly 16 as they move to their locking positions (FIGS. 12 and 13). The alignment flanges 138 each include a notch 184 for receiving the locking arm 174 and preventing rotational movement of the applicator assembly 26 when it is in its locked position (FIGS. 9 and 14).

A spring is provided to push the applicator assembly 26 away from the feed assembly when the locking arms 174 are disengaged to facilitate rotation of the applicator assembly by reducing the breakaway torque. The spring may comprise the curved washer 130, as shown in FIG. 2. The pinion shaft 106 extends through the curved washer 130 which is interposed between the two bushings 122, 124. The curved washer 130 pushes against the lower bushing 124 which is held in place by the snap-ring 126 connected to the pinion shaft 106 and forces the shaft in the forward direction to cause the applicator assembly 26 to be pushed away from the feed assembly 16 when the locking arms 174 are disengaged.

As shown in FIG. 9, one of the alignment flanges 138 includes two fingers 188 for contacting a stop 190 located on each locking mechanism 170. The applicator assembly 26 is aligned by the locking arms 174 engaging the alignment notches 184. The stop 190 is shaped to allow the locking arms 174 to pull the applicator assembly 26 into alignment with the feed assembly 16 and reduce impact on the pinion shaft 106.

The fiber placement head 12 includes a lock sensor 192 for sensing when the locking arms 174 are in their locking positions and a position sensor 194 for sensing the rotational position of the applicator assembly 26 (FIGS. 9 and 10). The position sensor 194 detects contact of one of the fingers 188 of the alignment flange 138 with one of the stops 190 of the locking mechanism 170 and activates the locking arms 174 to move to their locking positions. The lock sensor 192 is preferably a fiber optic sensor and the position sensor 194 is preferably a proximity switch. The sensors 192, 194 are located within the locking mechanism mounting block 178 and may be monitored by the system control unit. It is important for the system control unit to know the position of the applicator assembly 26 to prevent operation of the head 10 with the applicator in an unlocked position which could cause damage to the head.

The system control unit may also be used to monitor tow tension and temperature of the tows 15. The tension monitoring measures the tension in each tow 15 and provides a signal when the tension goes outside an acceptable range, as is well known to those skilled in the art. Tow sensors may be provided in each tow path to detect the presence of tows 15 in the tow path. It is to be understood that the system control unit, type of monitoring and type of sensors may be different than described herein without departing from the scope of the invention.

In order to lay tows 15 onto a surface S, the fiber placement head 12 is first positioned adjacent an edge of the surface S (FIG. 1). The pinch module 44 is actuated to release the tows 15 and the add rollers 80 are actuated to force the tows against the feed rollers 82 which are driven to advance the tows through the feed assembly 16 and deliver the tows to the applicator assembly 26 (FIG. 2). The add rollers 80 are preferably actuated at the same time or just prior to actuation of the pinch module 44 to release the tows 15 to prevent the tows from being pulled out of the head 10. The system control unit preferably synchronizes the activation of the add rollers 80 and pinch module 44 using delay compensation to adjust for electrical and mechanical delays.

The fiber placement head 12 is moved in a first direction while continuously advancing the tows 15 to apply the tows to the surface S in the first direction. Once the tows 15 are under the compaction device 30, the add rollers 80 are preferably disengaged and the tows are pulled out by friction created between the tows and the compaction device and surface S.

When the fiber placement head 12 reaches the end of the surface S the tows 15 are cut by the cutting assembly 24. When the tows 15 are cut, the pinch module 44 is actuated to grasp the tows. The tows 15 may also be individually cut at separate times to accommodate a tapered edge, for example. The compaction device 30 is moved away from the surface S, the locking arms 174 are disengaged from the alignment flanges 138 of the applicator assembly 26 (FIG. 13), and the rack 110 is pneumatically driven to rotate the pinion 108, shaft 106 and the applicator assembly 26 (FIG. 14). One of the fingers 188 located on the alignment flange 138 contacts the stop 190 on a respective locking arm 174 after the applicator assembly 26 has rotated 180 degrees (FIG. 9). The position sensor 194 senses the engagement of the finger 188 and stop 190 and actuates the locking arms 174 to push the applicator assembly 26 against the feed assembly 16 and securely lock the applicator assembly in place (FIGS. 10 and 11). The fiber placement head 12 then moves in the second direction and applies tows 15 to the surface S in the second direction. When the end of the surface S is reached the process is repeated.

It will be observed from the foregoing that the fiber placement head 12 of this invention has numerous advantages. Importantly, the rotatable applicator assembly 26 allows the fiber placement head 12 to lay tows 15 in two directions, thus greatly improving the productivity of the fiber placement head by decreasing the time required to reposition the head between laying rows of tows.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A fiber placement head reciprocally movable with respect to a surface for placing fiber tows from a tow source on the surface, the fiber placement head comprising:

a feed assembly for feeding fiber tows in a forward direction from said tow source to a front end of the feed assembly, the feed assembly having first and second sets of feed tow guides.

an applicator assembly at the front end of the feed assembly for receiving tows from the feed assembly and applying them to said surface, said applicator assembly having first and second sets of applicator tow guides and being mounted for rotation relative to the feed assembly between a first position in which the first set of applicator tow guides is aligned with the first set of feed tow guides for receiving tow therefrom and a second position in which the first set of applicator tow guides is aligned with the second set of feed tow guides for receiving tow therefrom, and a device for rotating the applicator assembly relative to the feed assembly between said first and second positions.

2. A fiber placement head as set forth in claim 1 wherein each said set of feed tow guides extends generally parallel to the other set of feed tow guides.

3. A fiber placement head as set forth in claim 2 wherein said device for rotating the applicator assembly comprises a shaft rotatably mounted between the two sets of feed tow guides, the shaft extending in a forward direction and being connected to the applicator assembly, and a drive system for turning the shaft to rotate the applicator assembly.

4. A fiber placement head as set forth in claim 3 wherein the drive system comprises a rack and a pinion.

5. A fiber placement head as set forth in claim 1 further comprising a cutting assembly adjacent the forward end of the feed assembly, said cutting assembly being operable for selectively cutting each of said tows prior to rotation of the applicator assembly between its first and second positions.

6. A fiber placement head as set forth in claim 5 wherein said cutting assembly comprises a plurality of knives each of which is mounted for movement from a retracted position to an extended position for cutting a respective tow, and then back to said retracted position.

7. A fiber placement head as set forth in claim 1 wherein the applicator assembly comprises a compaction device, and a plurality of rollers cooperable with the applicatortow guides for orienting the tows side-by-side to form an essentially continuous fiber band which is pressed against the surface by the compaction device.

8. A fiber placement head as set forth in claim 7 wherein the length of each applicator tow guide is less than about 4.0 inches.

9. A fiber placement head as set forth in claim 7 wherein the feed assembly includes a locking system for locking the applicator assembly in said first and second positions.

10. A fiber placement head as set forth in claim 9 wherein the locking system comprises a pair of locking mechanisms movable between a retracted position for allowing the applicator assembly to rotate between its said first and second positions about an axis of rotation, and a locking position in which the locking mechanisms engage the applicator assembly to prevent rotational movement of the applicator assembly with respect to said axis of rotation and in which the locking mechanisms bear the operational load of the applicator assembly.

11. A fiber placement head as set forth in claim 10 further comprising a spring for pushing the applicator assembly away from the feed assembly when the locking mechanisms are disengaged to facilitate rotation of the applicator assembly.

12. A fiber placement head as set forth in claim 10 wherein the applicator assembly includes a pair of frame members extending laterally outwardly from the applicator tow guides, and wherein the locking mechanisms comprise a pair of locking arms engageable with the frame members.

13. A fiber placement head as set forth in claim 12 further comprising a lock sensor for sensing when the locking arms are in a locking position and a position sensor for sensing the position of the applicator assembly.

14. A fiber placement head as set forth in claim 12 wherein the locking arms each have an upper tapered surface for engagement with a lower surface of the frame members so that the locking mechanisms push the applicator assembly toward the feed assembly as the applicator assembly moves to its locking position.

15. A fiber placement head as set forth in claim 10 wherein the axis of rotation of the applicator assembly is generally parallel to the direction of feed of the tows from the feed assembly.

16. A fiber placement head as set forth in claim 1 further comprising a center section and two side sections releasably mounted on the center section.

17. A fiber placement head as set forth in claim 16 further comprising a pneumatically actuated locking mechanism for locking and unlocking the side sections and the center section.

18. A fiber placement head as defined in claim 1 wherein the second set of applicator tow guides is aligned with the second feed tow guides for receiving tow therefrom when in said first position and is aligned with the first feed tow guide for receiving tow therefrom when in said second position.

19. A fiber placement head as defined in claim 18 wherein the first set of feed tow guides is offset from the second set of feed tow guides and the first set of applicator tow guides is offset from the second set of applicator tow guides such that the applicator tow guides lay down tows on a surface in side-by-side relationship.

20. A fiber placement head reciprocally movable with respect to a surface for placing fiber tows from a tow source on the surface, the fiber placement head comprising:

a feed assembly for feeding fiber tows in a forward direction from said tow source to a front end of the feed assembly.

an applicator assembly at the front end of the feed assembly for receiving tows from the feed assembly and applying them to said surface, said applicator assembly being mounted for rotation relative to the feed assembly, and a device for rotating the applicator assembly relative to the feed assembly between a first position for application of tows to said surface as the fiber placement head moves relative to the surface in a first direction, and a second position for application of tows to said surface as the fiber placement head moves relative to the surface in a second direction generally opposite said first direction; and a heater having an outlet located near the front end of the feed assembly, said applicator assembly including a heater manifold for receiving hot air from the heater and distributing hot air to the surface, the manifold having first and second rearwardly-facing inlets for receiving hot air from the heater and a forwardly-facing outlet for directing hot air onto said surface, the first inlet of the manifold being positioned for alignment with the heater outlet when the applicator assembly is in its said first position, and the second manifold inlet being positioned for alignment with the heater outlet when the applicator assembly is in its said second position.

* * * * *